Patented Dec. 16, 1930

1,785,466

UNITED STATES PATENT OFFICE

CHARLES S. WEBBER AND CYRIL J. STAUD, OF ROCHESTER, NEW YORK, ASSIGNORS TO EASTMAN KODAK COMPANY, OF ROCHESTER, NEW YORK, A CORPORATION OF NEW YORK

PROCESS FOR THE MANUFACTURE OF MIXED ESTERS OF CELLULOSE

No Drawing.   Application filed August 2, 1929.   Serial No. 383,148.

This invention relates to a process for the manufacture of mixed esters of cellulose and particularly to the manufacture of an acetyl cellulose which has in addition to the acetyl group, an aromatic organic acid group, attached to the cellulose molecule.

In our copending application Serial No. 383,147 we have described a process for the manufacture of mixed esters of cellulose in which is described the basic principles which govern the carrying out of this displacement reaction. Briefly, the reaction is as follows: An organic ester of cellulose, for example cellulose acetate, is dissolved in a solution containing an organic acid which has an ionization constant greater than that of the acid corresponding to the acid combined in the cellulose as an ester. We have found, as is well described in the above cited application, that such organic acids if they are solvents for the cellulose ester or can be dissolved in a suitable liquid which in conjunction with the acid is a solvent for the cellulose ester, and finally if the acid is sufficiently active, which is indicated, of course, by the value of the ionization constant of the acid, the acid will substitute some, at least, of the acid groups which are already attached to the cellulose.

In our copending application Serial No. 341,032 we have described the mixed esters of cellulose prepared by this process in which the acid group which substitutes for the acid group in the cellulose comprises the alpha hydroxy acids. In our copending application Serial No. 342,668 we have described the use of the alpha and gamma ketonic acids for this substitution reaction.

The saturated and unsaturated aliphatic organic acids which are suitable for our process are described in our copending application Serial No. 383,147.

The object of the present invention is to provide a process for the manufacture of mixed esters of cellulose in which the substituting acid is an aromatic organic acid. Other objects will hereinafter appear.

We have found that if an ester of cellulose and particularly cellulose acetate is dissolved in a solution which contains a suitable aromatic organic acid and is digested at an appropriate temperature in this solution, some of the acid groups which are combined with the cellulose molecule will be displaced by the aromatic acid.

The aromatic acids which we have found capable of performing this substitution or displacement of the esterifying group in the cellulose include all those aromatic organic acids which are more active than the acid corresponding to the ester in the cellulose. We have found this to be true in all of the reactions which we have conducted, and as this activity of the acid may be measured by its ionization constant, the discovery may be stated as follows: An aromatic organic acid will substitute or displace the esterifying group in a cellulose ester providing the ionization constant of the substituting acid is greater than the ionization constant of the acid combined with the cellulose. This statement must be modified somewhat by the physical characteristics of the acid such for instance as its melting point or its ability to dissolve in a solvent in which this reaction will take place as has hereinbefore been stated.

We have found as is described in our copending applications cited above that all organic acids which comply with the above limitations are suitable for this displacement reaction.

In these applications there is described the following acids which are suitable for replacing the acid group in all organic esters of cellulose in which they are more reactive than the acid in the cellulose: tartaric, racemic, malic, glycollic, glyceric, pyruvic, alpha-keto-butyric, alpha-keto-valeric, alpha-keto-caproic, and levulinic acids.

The acids which we will specifically define in this application will include the aromatic organic acids and specifically the ortho, meta, and para toluic acids, benzoic, mandelic and cinnamic acids. Other aromatic organic acids which comply with our limitations are, of course, equivalents of these acids.

The above listed acids will partially displace the esterifying group in any of the organic esters of cellulose, providing, of course, that the activity of the substituting acid is higher than the activity of the acid combined with the cellulose. The esterifying group, therefore, of cellulose benzoate, cellulose butyrate, cellulose propionate, cellulose acetate and similar organic esters of cellulose may be substituted by our process. The fully esterified ester, such for example as cellulose tri-acetate, or the hydrolyzed cellulose esters, for example, the cellulose acetates having less than 44.8% acetyl may be utilized, the degree of esterification or hydration of the cellulose ester being governed, of course, by the physical and chemical properties of the mixed ester which it is desired to produce. By varying the degree of hydrolysis of any particular ester a great many degrees of solubility, may be obtained varying from acetone solubility down to complete solubility in water as extremes.

If the acid be not a liquid at the temperature of the reaction it may be found necessary to use a solvent for the acid. This solvent must not enter into the displacement reaction but merely be a vehicle for bringing the reaction substances into intimate contact.

In the case of acids which are solid at the temperature at which the displacement is carried out the use of such a solvent is particularly advantageous. The solvents which we have used for this purpose include 1-4 dioxan, propionic acid, ethylene chloride and water. The use of water in many instances not only acts as a medium for liquefying the acid but likewise considerably increases the rate of reaction. It is advisible except as above noted in the use of water, that the dilution caused by the addition of these liquids be held as low as possible in order not to retard too greatly the reaction rate and even with the addition of water, too large a concentration should not be used.

The temperature of the reaction is preferably in the neighborhood of 100° C. At this temperature the reaction requires up to, in some instances, 100 days to obtain a certain type of mixed ester having a particular solubility. The reaction may be conducted in a suitable container on a steam bath the container preferably being equipped with a reflux condenser. While some decrease in the time of the reaction would be obtained if a higher temperature and greater than atmospheric pressure be used, we find that such is not essential; moreover it is advisable to regulate the temperatures below 150° C. for a degradation of the cellulose results above this temperature which renders the resulting products of little or no use.

We shall now give several specific examples for carrying out our process but it will be understood that we, shall not be restricted thereby except as indicated in the appended claims.

*Example 1.*—10 grams of cellulose acetate containing 32% acetyl is dissolved in 50 grams of meta toluic acid c. p. containing 5 grams of water at a temperature of 100° C. for 10 hours; a product is obtained upon precipitating in acetone and washing free from the acid with the precipitating liquid. This mixed ester is soluble in cold 75% aqueous 1-4 dioxan.

The melting point of this new mixed ester of cellulose was found to be 215 to 232° C.

*Example 2.*—2 grams of cellulose acetate containing 34.1% acetyl is digested in a suitable flask containing a reflux condenser with 10 grams of mandelic acid (alpha hydroxyl phenyl acetic acid) at a temperature of 120 to 130° C. for a period of 3⅓ hours the product upon being extracted and washed to neutrality, with ether results in a cellulose acetate mandelate which is soluble in chloroform, acetone, and 85% chloroform-alcohol, and is found to be soluble in ethylene chloride-methanol or other aliphatic halogenated hydrocarbons with the lower aliphatic alcohols.

*Example 3.*—50 grams of acetone soluble cellulose acetate containing 40% acetyl is dissolved in a solution containing 50 grams of c. p. salicylic acid and 250 c. c. of ethylene chloride. This solution is heated in a suitable container preferably equipped with a reflux condenser at a temperature of approximately 100° C. for a period of 260 hours. A mixed ester of cellulose containing both acetate and salicylate groups will be obtained which after precipitation and washing will be found to be soluble in 75% aqueous ethanol, 75% aqueous acetone, 75% chloroform-alcohol, and 75% ethylene chloride-alcohol. The mixed ester is found to be insoluble in acetone, 1-4 dioxan, water, and benzene-alcohol. Its melting point is 248 to 271° C. with an apparent acetyl content of 36.5%.

Various changes may be made in the type of ester in which this substitution reaction is conducted, in the use if required of the solvent for effecting an intimate contact between the ester and the cellulose, and in the replacing acid used without in any way departing from this invention or sacrificing any of the advantages derived therefrom.

What we claim as new and desire to secure by Letters Patent is:

1. A process for the production of mixed esters of cellulose which comprises treating acyl cellulose in a solution containing an aromatic organic acid having an ionization constant greater than $1.82 \times 10^{-5}$.

2. A process for the production of mixed esters of cellulose which comprises treating cellulose acetate in a solution containing an aromatic organic acid having an ionization constant greater than $1.82 \times 10^{-5}$.

3. A process for the production of mixed esters of cellulose which comprises treating a hydrolyzed cellulose acetate in a solution containing an aromatic organic acid having an ionization constant greater than 1.82 x 10⁻⁵.

4. A process for the production of mixed esters of cellulose which comprises treating an acyl cellulose in a solution containing an aromatic organic acid having an ionization constant greater than 1.82 x 10⁻⁵ and a solvent for the acid.

5. A process for the production of mixed esters of cellulose which comprises treating an acyl cellulose in a solution containing an aromatic organic acid having an ionization constant greater than 1.82 x 10⁻⁵ and 1–4 dioxan.

6. A process for the production of mixed esters of cellulose which comprises treating cellulose acetate in a solution containing an aromatic organic acid having an ionization constant greater than 1.82 x 10⁻⁵ and a solvent for the acid.

7. A process for the production of mixed esters of cellulose which comprises treating cellulose acetate in a solution containing an aromatic organic acid having an ionization constant greater than 1.82 x 10⁻⁵ and 1–4 dioxan.

8. A process for the production of mixed esters of cellulose which comprises treating a hydrolyzed cellulose acetate in a solution containing an aromatic organic acid having an ionization constant greater than 1.82 x 10⁻⁵ and a solvent for the acid.

9. A process for the production of mixed esters of cellulose which comprises treating hydrolyzed cellulose acetate in a solution containing an aromatic organic acid having an ionization constant greater than 1.82 x 10⁻⁵ and 1–4 dioxan.

10. A process for the production of mixed esters of cellulose which comprises treating an acyl cellulose in a solution containing toluic acid.

11. A process for the production of mixed esters of cellulose which comprises treating cellulose acetate in a solution containing toluic acid.

12. A process for the production of mixed esters of cellulose which comprises treating a hydrolyzed cellulose acetate in a solution containing toluic acid.

13. A process for the production of mixed esters of cellulose which comprises treating acyl cellulose in a solution containing toluic acid and a solvent for the acid.

14. A process for the production of mixed esters of cellulose which comprises treating acyl cellulose in a solution containing toluic acid and 1–4 dioxan.

15. A process for the production of mixed esters of cellulose which comprises treating cellulose acetate in a solution containing toluic acid and a solvent for the acid.

16. A process for the production of mixed esters of cellulose which comprises treating cellulose acetate in a solution containing toluic acid and 1–4 dioxan.

17. A process for the production of mixed esters of cellulose which comprises treating hydrolyzed cellulose acetate in a solution containing toluic acid and a solvent for the acid.

18. A process for the production of mixed esters of cellulose which comprises treating hydrolyzed cellulose acetate in a solution containing toluic acid and 1–4 dioxan.

19. A process for the production of mixed esters of cellulose which comprises treating acyl cellulose in a solution containing an aromatic organic acid having an ionization constant greater than 1.82 x 10⁻⁵ at approximately 100° C. until the desired solubility is obtained.

20. A process for the production of mixed esters of cellulose which comprises treating cellulose acetate in a solution containing an aromatic organic acid having an ionization constant greater than 1.82 x 10⁻⁵ at approximately 100° C. until a water soluble product is obtained.

21. A process for the production of mixed esters of cellulose which comprises treating hydrolyzed cellulose acetate in a solution containing an aromatic organic acid having an ionization constant greater than 1.82 x 10⁻⁵ at approximately 100° C. until a water soluble product is obtained.

22. Cellulose-aceto-toluate.

23. Water soluble cellulose aceto-toluate.

24. A mixed ester of cellulose comprising an acyl radical and an aromatic organic acid radical having an ionization constant greater than 7.2 x 10⁻⁵.

25. A mixed ester of cellulose comprising an acetyl radical and an aromatic organic acid radical having an ionization constant greater than 7.2 x 10⁻⁵.

26. A mixed ester of cellulose comprising an acyl radical and a toluic acid radical.

27. A mixed ester of cellulose comprising an acyl radical and an aromatic organic acid radical having an ionization constant greater than 7.2 x 10⁻⁵ which is water soluble.

Signed at Rochester, New York this 31st day of July, 1929.

CHARLES S. WEBBER.
CYRIL J. STAUD.